US009558696B2

(12) United States Patent
Son et al.

(10) Patent No.: US 9,558,696 B2
(45) Date of Patent: Jan. 31, 2017

(54) ELECTROPHORETIC DISPLAY DEVICE

(71) Applicant: LG Display Co., Ltd., Seoul (KR)

(72) Inventors: HoWon Son, Gyeongsangbuk-do (KR); ChungWan Oh, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 335 days.

(21) Appl. No.: 13/727,829

(22) Filed: Dec. 27, 2012

(65) Prior Publication Data

US 2014/0078034 A1 Mar. 20, 2014

(30) Foreign Application Priority Data

Sep. 14, 2012 (KR) ........................ 10-2012-0102444

(51) Int. Cl.
*G09G 3/34* (2006.01)
*G06F 3/038* (2013.01)

(52) U.S. Cl.
CPC ........ *G09G 3/344* (2013.01); *G09G 2330/021* (2013.01); *G09G 2330/026* (2013.01)

(58) Field of Classification Search
CPC .................................. G09G 3/344; G09G 3/34
USPC .......................................................... 345/107
See application file for complete search history.

(56) References Cited

U.S. PATENT DOCUMENTS

2005/0041004 A1 2/2005 Gates et al.
2008/0150887 A1 6/2008 Kim et al.
2008/0259071 A1 10/2008 Nemoto et al.
2010/0149158 A1 6/2010 Lee
2010/0277464 A1* 11/2010 Lee ...................... G09G 3/2927 345/213
2011/0298771 A1* 12/2011 Yoo et al. ..................... 345/211
2012/0001954 A1* 1/2012 Yamazaki ............ G09G 3/3406 345/690
2012/0113082 A1 5/2012 Lee
2012/0182282 A1* 7/2012 van Veenendaal et al. .. 345/212

FOREIGN PATENT DOCUMENTS

CN 101751867 A 6/2010
CN 102347748 A 2/2012
CN 102467886 A 5/2012
JP 2003-216111 A 7/2003
(Continued)

OTHER PUBLICATIONS

Japanese Office Action dated Mar. 18, 2014 for corresponding Patent Application No. JP 2012-284229.
(Continued)

*Primary Examiner* — Kwin Xie
(74) *Attorney, Agent, or Firm* — Morgan, Lewis & Bockius LLP

(57) ABSTRACT

This specification relates to an electrophoretic display device, and particularly, to an electrophoretic display device capable of reducing power consumption by blocking a leakage current generated from a Power On Reset (POR) circuit which resets each driver Integrated Circuit (IC) at an initial period, whereby a transistor as an active element connected to a POR circuit may be turned on by applying a positive voltage, other than a power supply voltage, to a gate thereof at an image update period to drive a bias block, and thereafter turned off at an image static period, thereby blocking a leakage current and accordingly reducing power consumption.

11 Claims, 3 Drawing Sheets

(56) References Cited

FOREIGN PATENT DOCUMENTS

| | | | |
|---|---|---|---|
| JP | 2007-503024 | A | 2/2007 |
| JP | 2005-158488 | A | 7/2008 |
| JP | 2008-158488 | A | 7/2008 |
| JP | 2008-292980 | A | 12/2008 |
| JP | 2009-237027 | A | 10/2009 |
| JP | 2010-107860 | A | 5/2010 |
| JP | 2010-204550 | A | 9/2010 |
| KR | 20120066278 | A | 6/2012 |

OTHER PUBLICATIONS

The First Office Action from the State Intellectual Property Office of the People's Republic of China dated Mar. 31, 2015, in Chinese counterpart application 201210568733.6.

* cited by examiner

ELECTROPHORETIC DISPLAY DEVICE

CROSS-REFERENCE TO RELATED APPLICATION

Pursuant to 35 U.S.C. §119(a), this application claims the benefit of earlier filing date and right of priority to Korean Application No. 10-2012-0102444, filed on Sep. 14, 2012, the contents of which is incorporated by reference herein in its entirety.

BACKGROUND OF THE INVENTION

1. Field of the Invention

This specification relates to an electrophoretic display device, and particularly, to an electrophoretic display device capable of reducing power consumption by blocking a leakage current generated from a Power On Reset (POR) circuit which resets each driver Integrated Circuit (IC) at an initial period.

2. Background of the Invention

In general, an electrophoretic display device is an electronic information display device using a phenomenon that colloidal particles move to one polarity when a pair of electrodes to which voltages are applied are put into a colloidal solution. The electrophoretic display device exhibits its characteristics such as wide viewing angle, high reflectivity, low power consumption and the like without using a backlight, and thus is spotlighted as an electronic device such as an electric paper and the like.

The electrophoretic display device includes an ElectroPhoretic Display (EPD) panel having a plurality of gate lines and data lines arranged in a matrix pattern to define pixels on intersecting points therebetween, a gate driver to drive each pixel via the respective gate line, a data driver to supply a data voltage to each pixel via the respective gate line, a timing controller to control those components, a power supply unit and the like.

The electrophoretic display device is provided with a Power On Reset (POR) circuit which senses power when the power is first applied in a power-off state to generate a reset signal for clearing remnant data within each driver to initiate an operation in a stable state and defining a driver initiation timing of each driver.

FIG. 1 is a schematic view showing a structure of a POR circuit provided in a driver of the related art electrophoretic display device.

As shown in FIG. 1, the POR circuit 2 is implemented as a passive device, and includes a first node N1 connected to a reset signal (RST) output end, a resistor R having one end to which a power supply voltage VCC is applied and connected to the first node N1, and a capacitor C having one end connected to the first node N1 and the other end connected to a second node N2.

A driver Integrated Circuit (IC) of the related art electrophoretic display device uses a signal generated from the POR circuit 2 as a control signal for another circuit. FIG. 1 exemplarily shows that the signal generated from the POR circuit 2 is applied as a control signal for a bias circuit or the like mounted in the driver IC.

Referring to FIG. 1, the POR circuit 2 is connected to a bias block 5 and a transistor TR as an active element via the second node N2. A control signal is applied to the bias block 5 as a voltage entered into the other end of the capacitor C is uniformly controlled from when a power supply voltage VCC applied to a gate of the transistor TR increases to exceed a threshold voltage Vth.

Here, the power supply voltage VCC is always applied to the gate of the transistor TR during a power-on period such that the transistor TR can normally operate immediately when a reset request comes from the exterior. Hence, after an image update period of the electrophoretic display device, the transistor TR is always kept in the turn-on state even at an image static period. Consequently, a leakage current continuously flows into a ground voltage (VSS) end in the bias block 5 as indicated with ‘a’.

The leakage current is generated by about 10 μA to 12 μA although it depends on the characteristic of the transistor TR. This may cause an increase in power consumption of the electrophoretic display device.

SUMMARY OF THE INVENTION

Therefore, to solve the shortcoming of the related art, an aspect of the detailed description is to provide an electrophoretic display device capable of reducing power consumption by blocking a leakage current generated from a POR circuit mounted in a driver.

To achieve these and other advantages and in accordance with the purpose of this specification, as embodied and broadly described herein, there is provided an electrophoretic display device including an electrophoretic panel driven by a time division into an image update period and an image static period and having a plurality pixels defined thereon for displaying the image, a gate driver having at least one gate driver Integrated Circuit (IC) for applying a gate driver voltage to the plurality of pixels, a data driver having at least one data driver integrated circuit for applying a data voltage to the plurality of pixels, and a power supply unit to generate a gate high voltage, a gate low voltage, a positive voltage, a negative voltage and a ground voltage, wherein at least one of the gate driver integrated circuit and the data driver integrated circuit may include a reset circuit to generate a reset signal in a power-on state, and a Thin Film Transistor (TFT) synchronized with the positive voltage or the gate high voltage and configured to supply a control signal for each circuit block in response to a signal output from the reset circuit.

The reset circuit may include a first node connected to an output end, a second node connected to the circuit block, a resistor having one end to which a power supply voltage (VCC) is applied and the other end connected to the first node, and a capacitor having one end connected to the first node and the other end connected to the second node.

The thin film transistor may include a gate to which the positive voltage is applied, a source to which the ground voltage is applied, and a drain connected to the second node.

The positive voltage may be output from the power supply unit to the data driver at a time point when the image update period starts.

The output of the positive voltage from the power supply unit to the data driver may be stopped at a time point when the image static period starts.

The data driver integrated circuit may include a main clock generator reset in response to the reset signal and configured to generate a main clock signal, a data processor to generate the data voltage in response to the main clock signal, a bias block to generate a bias voltage for outputting the data voltage to each of the pixels, and a level shifter to output the data voltage with the same voltage level as one of the positive voltage, the negative voltage and the ground voltage.

The bias block may be driven in response to an input of the control signal.

The thin film transistor may include a gate to which the gate high voltage is applied, a source to which the ground voltage is applied, and a drain connected to the second node.

The gate high voltage may be output from the power supply unit to the gate driver at a time point when the image update period starts.

The output of the gate high voltage from the power supply unit to the gate driver may be stopped at a time point when the image static period starts.

In accordance with a preferred embodiment of the present disclosure, a positive voltage other than a power supply voltage may be applied to a gate of a transistor as an active element connected to a reset circuit (or POR circuit), which is mounted within a driver of an electrophoretic display device, to turn the transistor on at an image update period so as to drive a bias block and thereafter turn the transistor off at an image static period, thereby blocking a leakage current and accordingly reducing power consumption.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of an electrophoretic display device and a driver integrated circuit thereof in accordance with the exemplary embodiments, with reference to the accompanying drawings. For the sake of brief description with reference to the drawings, the same or equivalent components will be provided with the same reference numbers, and description thereof will not be repeated.

Figure 1:
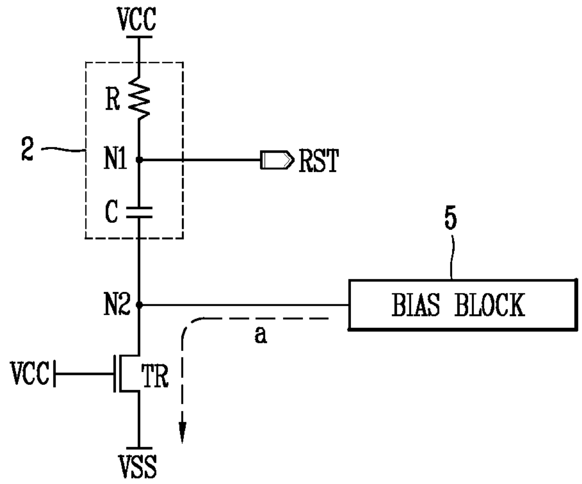
FIG. 1 RELATED ART
FIG. 1 is a schematic view showing a structure of a POR circuit provided in a driver of the related art electrophoretic display device.
Figure 2:
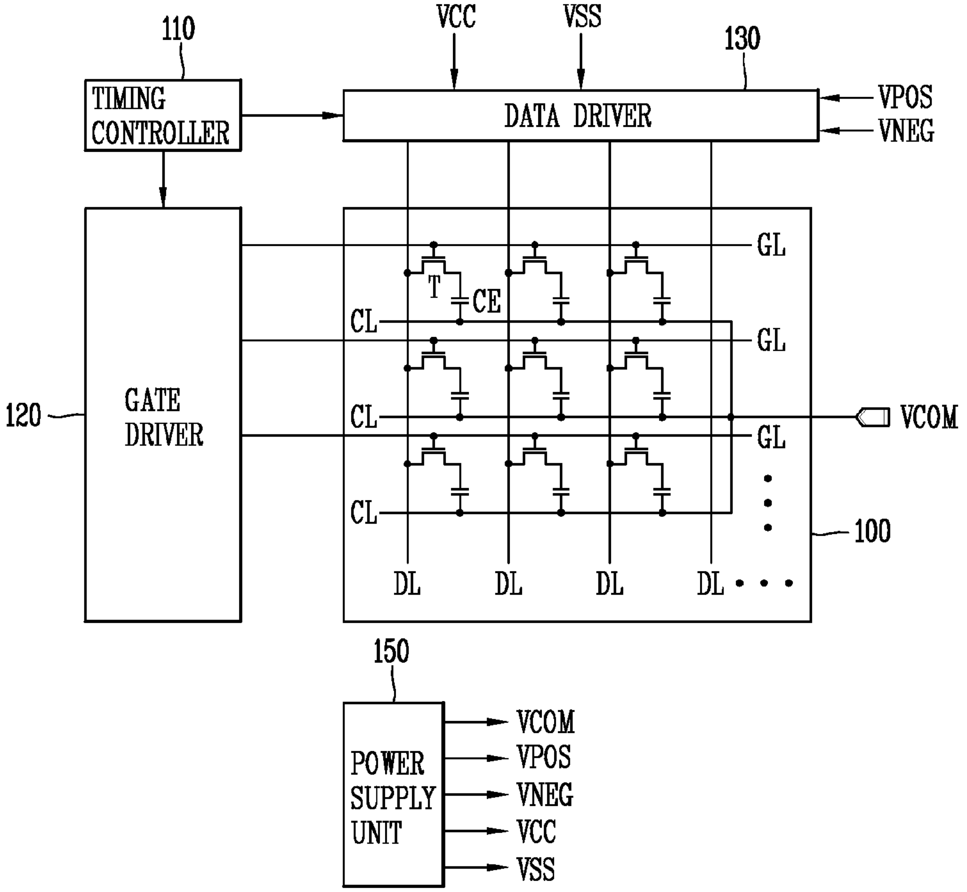
FIG. 2 is a view showing an entire structure of an electrophoretic display device in accordance with an exemplary embodiment of the present disclosure.

FIG. 2 is a view showing an entire structure of an electrophoretic display device in accordance with an exemplary embodiment of the present disclosure.

As shown in FIG. 2, an electrophoretic display device in accordance with an exemplary embodiment may include an EPD panel 100 having a plurality of gate lines GL and data lines DL arranged in a matrix pattern to define pixels on intersecting points therebetween, a gate driver 120 to drive each pixel via the respective gate line GL, a data driver 130 to supply a data voltage to each pixel via the respective data line DL, a timing controller 140 to control those components, a power supply unit 150 and the like.

The EPD panel 100 may include a plurality of pixels CE each having a plurality of microcapsules formed between a common electrode and a pixel electrode. Here, the common electrode may be made of a transparent electrode material, for example, Indium Tin Oxide (ITO). Each of the microcapsules may contain a plurality of white particles charged with a negative (minus) polarity and a plurality of black particles charged with a positive (plus) polarity.

Also, on a lower substrate configuring the EPD panel 100 may be arranged the plurality of gate lines GL and data lines DL with intersecting with each other in a matrix pattern. The lower substrate may be formed of one of glass, metal or plastic. A Thin Film Transistor (TFT) T may be formed on the intersecting point between the respective gate line GL and the respective data line DL. A gate of each TFT T may be connected to the gate line GL, and a source thereof may be connected to the data line DL. Also, a drain thereof may be connected to a pixel electrode of the pixel CE. The pixel CE may display a black gradation when a positive voltage VPOS is applied to the pixel electrode of the corresponding pixel CE, and display a white gradation when a negative voltage VNEG is applied to the pixel electrode of the corresponding pixel CE.

A new data voltage may enter the pixel CE during an image update process. After the image updating, the pixel CE may maintain a currently entered data voltage level until the next data updating. That is, the EPD panel 100 may be subject to a time division driving by being divided into an image update period and an image static period.

The gate of the TFT T may be connected to the gate line GL and turned on in response to a gate driver signal applied via the gate line GL to select a horizontal line of pixels CE to display. Accordingly, the TFT T may supply a data voltage applied via the data line DL to the pixel electrode of each of the selected pixels CE. On an upper substrate of the EPD panel 100 may be formed common lines CL to simultaneously supply a common voltage VCOM to common electrodes which face the respective pixel electrodes of the pixels CE. The upper substrate may be made of transparent glass or plastic.

The timing controller 110 may receive an image signal in a digital form transmitted from an external system, and although not shown, a timing signal such as a horizontal synchronization signal Hsync, a vertical synchronization signal Vsync, a data enable signal DE and the like, generating and outputting control signals for the gate driver 120 and the data driver 130.

The gate driver 120 may include at least one gate driver Integrated Circuit (IC). The gate driver IC may be configured with a plurality of shift registers, and include a level shifter for converting an output signal of the respective shift register into a swing width appropriate to drive the TFT T, an output buffer connected between the level shifter and the gate line GL, and the like. The gate driver 120 may sequentially output a scan signal, which is synchronized with a data voltage supplied to the data line DL, during the image update period. The scan signal may be a signal having a voltage level which swings between a gate high voltage GVDD and a gate low voltage GVEE.

The data driver 130 may include a data processor, which is equipped with a shift register, a latch and a decoder, a bias block and a level shifter. The data driver 130 may include at least one data driver IC to output a data voltage having the same voltage level as one of a negative voltage VPOS, a negative voltage VNEG and a ground voltage VSS. The data driver IC of the data driver 130 may be mounted onto the lower substrate of the EPD panel in a Chip On Film (COF) manner.

The data driver IC may output a positive voltage VPOS of +15V, a negative voltage VNEG of −15V and a ground voltage VSS of 0V all of which have an analog form, in response to digital data input from the timing controller 110 during the image update period. That is, the data driver IC may output one selected from three-phase voltages VPOS, VNEG and VSS as a data voltage via the data line DL, in response to the digital data input from the timing controller 110 during the image update process. The data voltage may be supplied to the pixel electrode of the pixel CE via the data line DL and the TFT T.

The power supply unit 150 may generate driving voltages VCC, VCOM VPOS and VNEG using a Direct Current (DC) to DC converter, which is driven by a voltage input when the electrophoretic display device is turned on. The power supply voltage VCC may be a logic voltage which is necessary to drive a control IC of the timing controller 110, the gate driver IC of the gate driver 120 and the data driver IC of the data driver 130. For example, the power supply voltage VCC may be a DC voltage of 3.3 V. Also, the positive voltage VPOS may be a DC voltage of +15V, and the negative voltage VNEG may be a DC voltage of −15V. The common voltage may be decided as a DC voltage between 0V and −2V. The gate low voltage GVEE may be a DC voltage of −20V, and the gate high voltage GVDD may be a DC voltage of +22V.

The control IC of the controller and the driver ICs of the drivers having such configurations may be provided therein with a Power On Reset (POR) circuit (i.e., reset circuit) to sense power when the power is first applied thereto so as to generate a reset signal for clearing remnant data within each driver to initiate an operation in a stable state and defining a driving initiation time point of each driver IC. The POR circuit is a circuit for generating a reset signal in correspondence to a turn-on time point of the electrophoretic display device. The POR circuit may generate a reset signal RST by receiving the power supply voltage VCC output from the power supply unit 150.

Also, the POR circuit may generate control signals for some of circuit blocks within each driver IC as well as the reset signal RST. Especially, the exemplary embodiment of the present disclosure may use the control signal to control a bias block for generating a bias voltage required when the driver IC outputs a signal. To generate the control signal, an output end of the POR circuit may typically be connected to an active element. The active element may supply the control signals to the circuit blocks in response to a positive voltage VPOS, other than the power supply voltage VCC supplied from the power supply unit 150.

Here, the power supply unit 150 may be a signal for supplying the positive voltage VPOS to the data driver 130 during an image update period of the electrophoretic display device, and stopping the supply of the positive voltage VPOS during an image static period. Therefore, the control signal may be supplied to the active element only during the image update period. The active element may thus be turned off at other periods except for the image update period. That is, a leakage current may not be generated any more from each circuit block, which receives the control signal, during the image static period because the active element is in a turn-off state.

Hereinafter, description will be given of a structure of a driver IC of the electrophoretic display device in accordance with the exemplary embodiment with reference to the accompanying drawings.

Figure 3:
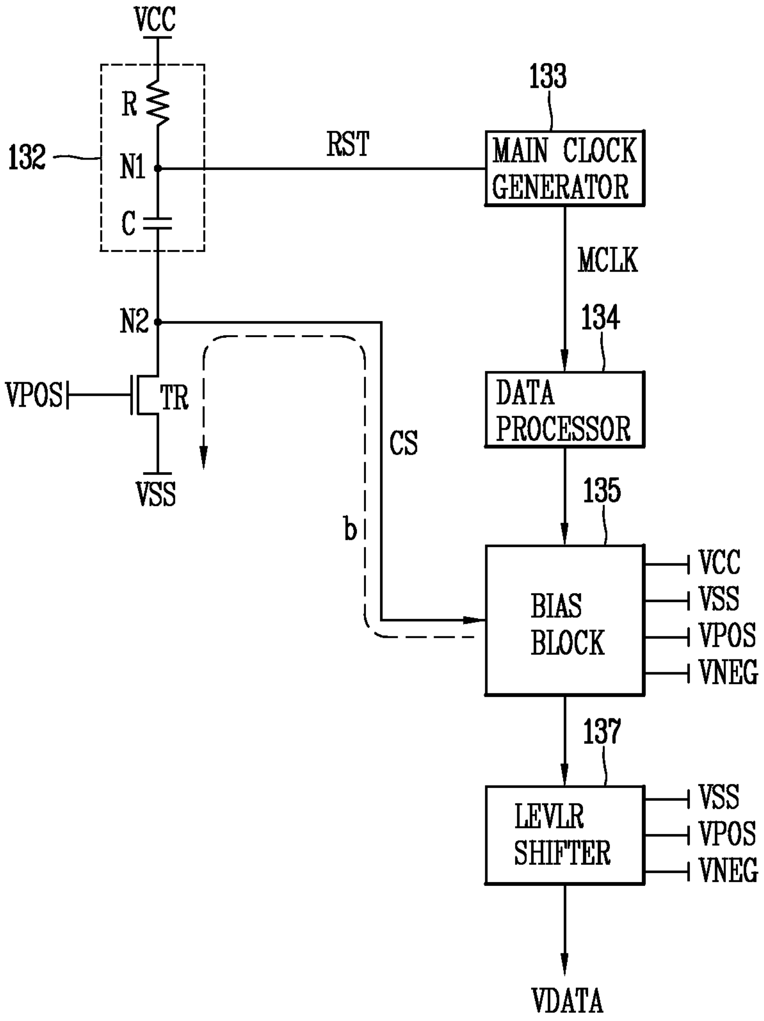
FIG. 3 is a view showing an internal structure of a data driver of the electrophoretic display device.

FIG. 3 is a view showing an internal structure of the data driver IC of the data driver in the electrophoretic display device.

As shown in FIG. 3, the data driver IC of the data driver 130 in accordance with the exemplary embodiment may include a POR circuit 132, a main block generator 133, a data processor 134, a bias block 135 and a level shifter 137.

The POR circuit 132 may be implemented as a passive element, and include a first node N1 connected to a reset signal (RST) output end, a resistor having one end to which a power supply voltage VCC is applied and the other end connected to the first node N1, and a capacitor C having one end connected to the first node N1 and the other end connected to the second node N2.

The POR circuit 132 may receive the power supply voltage VCC applied, and generate a reset signal RST using a Resistance-Capacitance (RC) delay of the passive element. The generated reset signal RST may be used as a control signal for another circuit block. FIG. 3 exemplarily shows, but not limited to, an example that the reset signal RST is used as a control signal for the bias block mounted in the driver IC.

The main clock generator 133 may generate a main clock signal MCLK, which clears remnant data within each driver IC of the data driver 130 and serves as an operation reference of each circuit block, in response to the reset signal RST generated from the POR circuit 132.

The data processor 134 may convert data in a digital form applied from the timing controller 110 (see FIG. 2) into a data voltage in an analog form, in response to the main clock signal MCLK, and then output it to the bias block 135. To this end, the data processor 134 may include a shift register, a latch and a decoder.

The bias block 135 may serve to uniformly maintain a bias voltage of the level shifter 137 when the data voltage applied from the data processor 135 is output to the EPD panel 100 (see FIG. 2) via the level shifter 137. The bias block 135 is an analog driver circuit which is driven by a control signal CS based on a power supply voltage VCC. A voltage level of the control signal CS may be decided by a transistor TR connected to the POR circuit 132. The POR circuit 132 may be configured by combination of predetermined passive elements. The TFT TR may be electrically connected to a node of a passive element of the predetermined passive elements, so as to stabilize a voltage entering the second node N2 from when the positive voltage VPOS applied from the power supply unit 150 (see FIG. 2) exceeds a threshold voltage of the TFT TR. Accordingly, the stabilized voltage of the second node N2 may be supplied to the bias block 135 as a control signal CS, and a data voltage applied in response to the bias voltage may be output to the level shifter 137.

The level shifter 137 may receive a positive voltage VPOS, a negative voltage VNEG and a ground voltage VSS from the power supply unit 150 (see FIG. 2). The level shifter 137 may output as a data voltage VDATA by selecting one of the three phase voltages in response to the data voltage applied based on the bias voltage.

In the data driver IC of the data driver 130 with this structure, when the electrophoretic display device enters an image update period, a current flows from the bias block 135 to a source of the TFT TR to which the ground voltage VSS is applied, in response to the voltage level of the control signal CS. However, after the image update period, the positive voltage VPOS may not be applied at the image static period and accordingly the TFT TR may be turned off. This may result in blocking a leakage current generated in the bias block 135 as indicated with 'b'.

Figure 4:
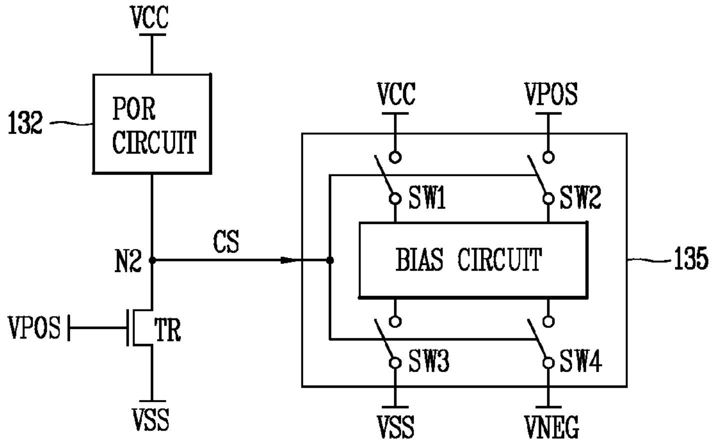
FIG. 4 is a view showing one example of an internal structure of a bias block shown in FIG. 3.
Figure 5:
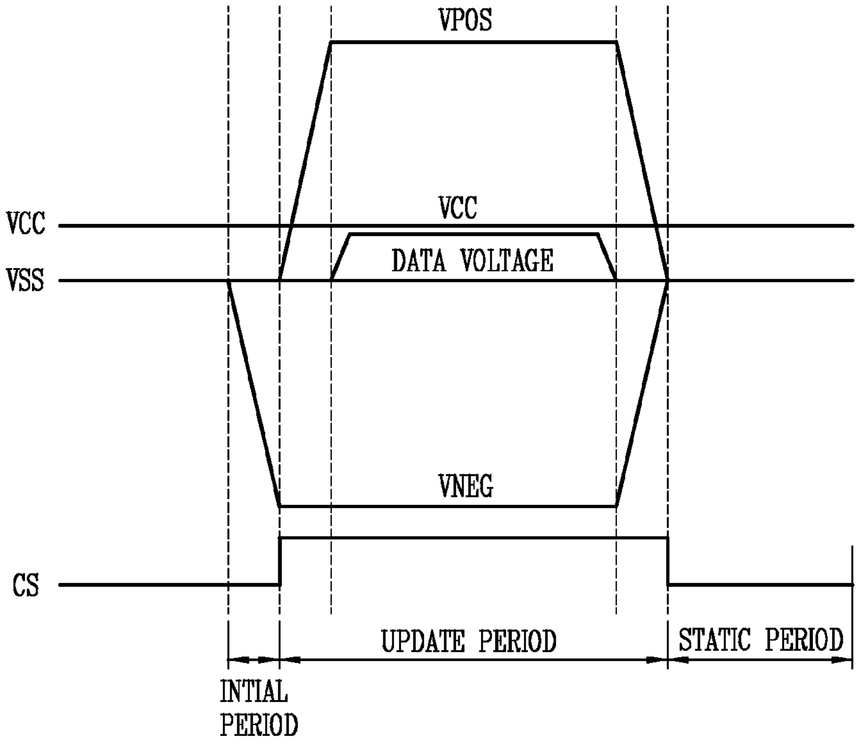
FIG. 5 is a view showing one example of a voltage waveform at a random time point when a signal is applied to the data driver IC.

FIG. 4 is a view showing one example of an internal structure of the bias block shown in FIG. 3, and FIG. 5 is a view showing one example of a voltage waveform at a random time point when a signal is applied to the data driver.

As shown in FIGS. 4 and 5, the bias block 135 may receive the power supply voltage VCC, the ground voltage VSS, the positive voltage VPOS and the negative voltage VNEG. The bias block 135 may be connected to respective voltage input ends via switches SW1 to SW4.

With the configuration, when the power supply voltage VCC is applied to the POR circuit 132 in response to power being applied at an initial period, the POR circuit 132 may generate a reset signal. However, since the TFT TR is turned on by the positive voltage VPOS, a voltage entering the second node N2 may not reach a level high enough to switch on (turn on, close) each switch SW1 to SW4 of the bias block 135. Accordingly, a leakage current may not be generated between the bias block 135 and the TFT TR.

Afterwards, when the power supply voltage VCC, the ground voltage VSS, the positive voltage VPOS and the negative voltage VNEG are applied to the bias block 135 as the electrophoretic display device enters the image update period, the positive voltage VPOS may be applied to a gate of the TFT TR in synchronization with the supply of the voltages. Accordingly, a control signal of a predetermined level may be applied to the bias block 135 and each switch SW1 to SW4 may be switched on, thereby driver a bias circuit.

Next, when the electrophoretic display device enters the image static period, the power supply voltage VCC, the ground voltage VSS, the positive voltage VPOS and the negative voltage VNEG may not be applied to the bias block 135 any more. In synchronization with the stop of the voltage supply, the positive voltage VPOS may not be supplied to the gate of the TFT TR either and a potential of the second node N2 may be lowered. Accordingly, the voltage level of the control signal CS may become the same level as the initial period. This may thus open the switches SW1 to SW4.

Also, as the TFT TR is turned off, the leakage current flowing from the bias block 135 to the source of the TFT TR may be blocked.

As described above, the electrophoretic display device according to the exemplary embodiment of the present disclosure may control the voltages applied to the bias circuit at the image static period in synchronization with the positive voltage, thereby blocking the leakage current and reducing power consumption.

In the meantime, the aforementioned exemplary embodiment has illustrated that the leakage current of the bias circuit is blocked by use of the control signal generated via the reset circuit mounted in the data driver IC of the data driver. However, another exemplary embodiment in which the bias circuit for evenly maintaining the output of the level shifter is mounted within the gate driver IC of the gate driver. Therefore, another exemplary embodiment of blocking a leakage current generated from the bias circuit by converting the power supply voltage VCC applied to a TFT connected to a reset circuit of the gate driver IC into a gate high voltage GVDD may be implemented.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electrophoretic display device comprising:

an electrophoretic panel driven by a time division into an image update period and an image static period and having a plurality pixels defined thereon to display the image;

a gate driver having at least one gate driver integrated circuit (IC) to apply a gate driving voltage to the plurality of pixels;

a data driver having at least one data driver integrated circuit to apply a data voltage to the plurality of pixels; and a power supply unit to generate a gate high voltage, a gate low voltage, a positive voltage, a negative voltage and a ground voltage, wherein at least one of the gate driver integrated circuit and the data driver integrated circuit comprises:

a reset circuit to generate a reset signal in a power-on state, the reset circuit including:

a first node connected to an output end, the output end to supply the reset signal;

a second node connected to a bias block;

a resistor having one end to which a power supply voltage (VCC) is applied and the other end connected to the first node; and a capacitor having one end connected to the first node and the other end connected to the second node; and a thin film transistor (TFT) synchronized with the positive voltage, the thin film transistor connected between the second node and the ground voltage, the thin film transistor to supply a control signal to the bias block in response to a signal output from the second node of the reset circuit, wherein the capacitor is electrically connected in series between the resistor and the thin film transistor, wherein the output of the positive voltage from the power supply unit to the data driver or the gate driver is stopped at a time point when the image static period starts such that the positive voltage is not supplied to the gate of the thin film transistor.

2. The device of claim 1, wherein the transistor comprises:

a gate to which the positive voltage is applied;

a source to which the ground voltage is applied; and a drain connected to the second node.

3. The device of claim 1, wherein the positive voltage is output from the power supply unit to the data driver at a time point when the image update period starts.

4. The device of claim 1, wherein the data driver integrated circuit comprises:

a main clock generator reset in response to the reset signal and configured to generate a main clock signal;

a data processor to generate the data voltage in response to the main clock signal;

the bias block to generate a bias voltage for outputting the data voltage to each of the pixels; and a level shifter to output the data voltage with the same voltage level as one of the positive voltage, the negative voltage and the ground voltage.

5. The device of claim 4, wherein the bias block is driven in response to an input of the control signal.

6. The device of claim 1, wherein the device is configured to generate a main clock signal in response to the reset signal.

7. The device of claim 1, wherein the power supply unit is configured to generate the power supply voltage (VCC), wherein the power supply voltage (VCC) is a logic voltage to drive the timing controller, the gate driver, and the data driver.

8. The device of claim 1, wherein the thin film transistor is configured to stabilize a voltage at the second node when the positive voltage exceeds a threshold voltage of the thin film transistor, and the stabilized voltage is configured to be supplied to the bias block as the control signal.

9. The device of claim 1, wherein the first node is directly connected to the output end.

10. The device of claim 9, wherein the capacitor is directly connected in series between the resistor and the thin film transistor.

11. The device of claim 10, wherein the thin film transistor is directly connected between the second node and the ground voltage.

* * * * *